United States Patent [19]

Kent et al.

[11] 4,261,863

[45] * Apr. 14, 1981

[54] OZONE CONTROL CATALYST COMPOSITIONS

[75] Inventors: Ronald A. Kent, Houston, Tex.; Marvin M. Fein, Westfield, N.J.

[73] Assignee: Dart Industries Inc., Los Angeles, Calif.

[*] Notice: The portion of the term of this patent subsequent to Nov. 6, 1996, has been disclaimed.

[21] Appl. No.: 91,017

[22] Filed: Nov. 5, 1979

Related U.S. Application Data

[63] Continuation-in-part of Ser. No. 944,836, Sep. 22, 1978, Pat. No. 4,173,549.

[51] Int. Cl.³ ............... B01J 21/04; B01J 21/06; B01J 23/34; B01J 23/50

[52] U.S. Cl. ................. 252/463; 252/471; 423/219

[58] Field of Search ............... 252/463, 471; 423/219

[56] References Cited

U.S. PATENT DOCUMENTS 3,682,585  8/1972  Frevel et al. ............ 252/471 X

Primary Examiner—W. J. Shine
Attorney, Agent, or Firm—Bryant W. Brennan; Harold R. Beck

[57] ABSTRACT

A highly efficient novel catalyst composition for ozone removal is made from
(a) metallic silver deposited on a relatively high surface area metal substrate and
(b) a composite of a relatively high surface area zirconia and oxides of manganese.

28 Claims, No Drawings

OZONE CONTROL CATALYST COMPOSITIONS

This application is a continuation-in-part of U.S. application Ser. No. 944,836, filed Sept. 22, 1978, now U.S. Pat. No. 4,173,549.

BACKGROUND OF THE INVENTION

Ozone is generated for use in many chemical processes requiring reactions to be carried out in the presence of a strong oxidant. Ozone is also generated as an undesired by-product in other processes, e.g. during use of certain electronic equipment such as electronic photocopying machines. Because of the toxic and irritating effects on humans, any ozone present in the process waste effluents must be destroyed before said effluents can be released to the environment. The removal of ozone from the exhaust streams of the aforementioned processes to acceptable levels are not too difficult and can be achieved e.g. by thermal destruction, by adsorption employing activated carbon, or by catalytic destruction using e.g. activated carbon-supported silver or copper catalyst.

The efficient control of ozone in the environment is, however, a problem in certain situations, where space and/or energy limitations preclude the use of the aforementioned conventional ozone destruction methods. Specifically, in order to conserve fuel on long distance flights, modern aircraft fly at such high altitudes, that they often penetrate the ozone layer of the earth's atmosphere. Ozone is thereby introduced with the pressurized air into the cabin, causing discomfort and potential health hazards to passengers and flight crew. The pressurized fresh cabin air, which is provided from an intermediate compression stage in the ramjet engines, is introduced at very high rates, typically in the order of 5 pounds of air per second in larger commercial passenger planes. The use of activated carbon as an adsorbent or catalyst support for purification of the air is not a desirable solution, since the weight (approximately 400 lbs) and, more importantly, the space requirements of the purification medium to treat such large quantities of air would be excessive, and would necessitate major changes in the design of the air circulation system. Another disadvantage of activated carbon is its relatively short service life at the delivery temperatures of the compressed air (typically between 300 and 400° F.). Furthermore, activated carbon is quite brittle and is prone to disintegration during periods of high turbulence. Dust produced in such situations would be entrained in the purified air being supplied to the cabin and would require additional equipment for removal.

The use of higher temperatures, e.g. by taking the air from a rear stage of the engine, to destroy the ozone is technically feasible, but is energy consuming, thus significantly negating the fuel savings achieved by flying at the higher altitudes.

It is therefore an object of the present invention to provide a novel efficient catalyst composition for the reduction of ozone levels.

It is another object of the invention to provide a catalyst and a device for the destruction of unwanted ozone with minimum energy requirements which is lightweight and operates with minimum pressure drop and at lower temperatures.

It is a further object to provide an ozone control device which can be installed in the pneumatic duct of an airplane.

Further objects of the invention will become apparent from a reading of the specification and appended claims.

THE INVENTION

In accordance with the invention there is provided a catalyst composition which comprises
 (a) metallic silver deposited on a relatively high surface area metal substrate, and
 (b) a composite of a relatively high surface area zirconia and oxides of manganese.

The relatively high surface area metal substrate can be a particulate metal, having an average particle size of from about 0.2 to about 10 mm with roughened surface. The preferred metal substrates are those having a continuous structure of relatively high surface area, such as fibrous felts, fine wire mesh net cloths and foams. Generally, materials with relative densities of from about 2 to about 40 percent (based on the density of the solid metal) are suitable in this invention. The most preferred materials are those having relative densities in the range from about 2 to about 10 percent. These materials are all commercially available.

Illustrative examples of suitable metals are nickel, aluminum, zinc coated aluminum, copper, tungsten, chromium and molybdenum. The use of copper as the metal substrate has been disclosed in copending patent application Ser. No. 944,836, filed on Sept. 22, 1978, now U.S. Pat. No. 4,173,549.

The silver is deposited on the metal substrate, illustratively a nickel substrate, to a thickness ranging from about 0.001 to about 10 mils, preferably from about 0.1 to about 1 mil. The deposition can be carried out using any conventional plating process including electrolytic plating. Applicants have found, however, that a particularly advantageous method of forming an adherent silver coating onto the metal substrate is one where the metal is first pretreated with an ammoniacal solution for removal of surface metallic oxides and for etching of the surface. In a subsequent step the etched metal is treated with a soluble silver salt solution to cause replacement deposition of silver onto the roughened surface of the metal substrate.

In the aforementioned pretreatment step the concentration of the ammoniacal solution is typically maintained between about 1 and about 15 weight percent of $NH_3$. The metal, illustratively nickel, substrate is immersed in the solution for a period of about 10 to about 100 seconds at room temperature, after which it is rinsed one or more times with water. Preferably deionized water is used at least for the last rinse.

The pretreated substrate still having wetted surfaces is then immersed for a period of 0.5 to 50 minutes into an aqueous silver salt solution containing from about 0.01 to about 100 g/liter of soluble silver metal, preferably from about 0.1 to about 10 g/liter, and maintained at room temperature, although higher temperatures can also be used. The resulting silver plated metal, illustratively nickel, is then rinsed with water one or more times, preferably with deionized water after which it is dried in an oven.

The zirconia can be a particulate zirconia having an average particle size in the range from about 0.2 to about 10 mm. The preferred zirconia compounds are those having a continuous structure of relative high surface area, such as fibrous felts and woven or knit cloths. Generally materials having relative densities of from about 2 to about 40 percent (based on the density of solid zirconia) are suitable in this invention. The most preferred materials are those having relative densities in the range from about 2 to about 20 percent. The zirconia is usually stabilized with small additions of other oxides such as silica, ferric oxide, titania, yttria, calcium oxide to improve their thermal-mechanical properties. These materials are all commercially available.

The composite of zirconia and oxides of manganese is suitably prepared by first immersing or spraying the zirconia with a solution of a soluble permanganate, such as sodium or potassium permanganate, or of a soluble divalent manganese compound such as manganous nitrate, and then drying the treated zirconia. The application treatment can be carried out at room temperature or higher temperatures using a solution containing from about 0.01 to about 1 gram mols/liter of the manganese compound.

The oxides of manganese are formed by heat treating any of the aforementioned zirconia/manganese compounds at a temperature from about 120° F. to about 450° F. This heat treatment can be carried out after the catalyst components are assembled into the catalyst composition, and even later, i.e. during use of the catalyst composition, if the ozone removal is carried out at temperatures of at least 200° F.

The concentration of the oxides of manganese should be from about 0.1 to about 10 percent based on the weight of the zirconia, preferably between 0.1 and about 0.5 percent.

Composites of zirconia/manganese oxides can also be prepared by any other suitable method, e.g. by first forming a coprecipitate of either hydroxides or carbonates by the action of respectively an alkali or a carbonate upon a solution of a zirconium salt and a manganese salt or a permanganate. The coprecipitate is then filtered, dried, calcined, preferably in the presence of stabilizers, to improve the thermal-mechanical properties, and shaped into particles, fibers, felts, cloths, etc.

The two components, i.e. (a) the silver coated metal and (b) the zirconia treated with the manganese compound (before or after heat treatment) are combined to provide a volumetric ratio of components (a) and (b) from about 1.5 to about 100:1, preferably from about 1:2 to about 50:1. When they are in particulate or fibrous form, the components may be mixed together, or arranged in alternate layers, separated, if desired, by retaining screens.

The catalyst mixture is suitably contained in a walled device, e.g. a length of stainless steel pipe, provided with retaining screens at the ends to prevent escape of catalyst with the ozone containing stream passing through the device.

However, the preferred catalyst compositions are those where the components are not subject to any significant entrainment by the gas being treated, even under conditions of severe vibration or turbulence. Thus, it is preferred to use the metal and the zirconia in extended shapes or forms such as screens, felts, foams, cloths, woven nets as base materials for the two components.

Catalytic devices can easily be constructed by arranging the silver coated metal wire, felt or foam and the manganese treated zirconia felt or cloth in alternate layers within a suitable housing having gas inlet and outlet means. The layers can be arranged angularly, e.g. perpendicularly, to the direction of the gas flow or in the same direction as that of the gas flow. These arrangements can be made, e.g. by cutting discs or wafers of equal areas from the two materials and stacking them in alternate layers or by placing two rectangular pieces of the two materials one on the other and winding them around a mandrel in a cylindrical fashion.

The catalyst compositions of this invention are highly effective in removing ozone from gas streams even at very high space velocities, (weight or volume of gas treated per weight or volume of catalyst). In fact, their efficiencies, when compared either on a weight or a volumetric basis, are superior to those of the prior art catalysts as well as to the efficiencies of either of the components of the compositions. In addition, the compositions of this invention are not subject to significant deterioration by either heat or vibratory movements and have a superior service life. Furthermore, they offer very little pressure resistance, i.e. the pressure drop is minimal in use. Because of the above-mentioned desired characteristics and the inherent low requirements of energy, space and weight for purification of large quantities of ozone-containing gases, the catalyst compositions are particularly useful for installation in existing pneumatic ducts on aircraft. However, the catalyst compositions are also useful for the control of ozone levels in any gaseous stream, which needs to be purified before being vented to the environment.

The following examples are provided to illustrate the invention.

EXAMPLE 1

A cylindrical laminar catalytic device having a diameter of 2 inches and a height of 1 inch was prepared by alternating layers of permanganate treated zirconia felt with silver coated copper foam. The thickness of each of the 5 circular zirconia layers was 5/100 of an inch and that of each of the 4 interspaced circular copper layers was 3/16 of an inch.

Before the assembly the zirconia circular wafers had been cut from a zirconia felt, having a relative density of 4 percent (8 percent yttria stabilized, type ZYF-50 obtained from Zircar Products, Inc., Florida, N.Y.). Then they were soaked in a bath containing a 0.1 M solution of potassium permanganate until thoroughly wetted and finally air dried.

The circular wafers of copper were cut from a copper foam having a relative density of about 15 percent (type 55P copper Foametal obtained from Hogen Industries, Willoughby, Ohio).

The wafers were pretreated for 15 seconds in a bath maintained at room temperature and prepared from equal volumes of concentrated ammonium hydroxide and water. The wafers were then rinsed thoroughly first with tap water and then with deionized water. After shaking water out of the foam wafers, they were immersed in a 0.01 M silver nitrate bath for about 4 minutes at room temperature. After removal from the bath, excess solution was shaken out of the wafers, which were then rinsed with deionized water and dried in an oven at 75° C. overnight.

The catalytic device was installed in a pipe and its efficiency was tested at 300° F. and 400° F. by passing air containing 1.5 ppm (by volume) of ozone at velocities ranging between 200 and 800 ft/min through the device. At 300° F. the ozone removal was 86–98 percent, and at 400° F. the ozone removal was 92–99 percent. The efficiencies did not appear to be velocity dependent.

EXAMPLE 2

A cylindrical catalytic device (10 inch diameter, height 2.5 inches) was prepared by placing a length of permanganate treated zirconia tricot weave cloth onto a length of silver coated copper foam and winding the two layers tightly in a spiral fashion around a 2.5 inch long mandrel having a diameter of one inch. The mandrel was fabricated from copper pipe closed off at each end with 316 stainless steel cap affixed with silver solder.

The zirconia cloth was a tricot knit zirconia having a relative density of 15 percent and a thickness of 0.015 inches (8 percent yttria stabilized, type ZYK 15 obtained from Zircar Products, Inc.). The permanganate treatment of the cloth prior to assembly was carried out in accordance with the method set forth in Example 1.

The copper foam substrate used in this example had a relative density of about 2-4 percent and a thickness of ⅛ inch (type 30P Copper Foametal obtained from Hogen Industries). The silver coating procedure was essentially the same as that of Example 1 except that the immersion time in the silver nitrate bath was 1.5 minutes.

The efficiency of the catalytic device was tested by passing ozone containing air at high rates through the cylinder. The results of the tests are shown below in Table I.

TABLE I

| Temp °F. | Air Rates lbs/sec | Air Rates ft/min | Ozone - ppm Inlet | Ozone - ppm Outlet | Efficiency % | Press. Drop psi |
|---|---|---|---|---|---|---|
| 345 | 2.17 | 2337 | 1.49 | 0.05 | 97 | 2.00 |
| 405 | 2.14 | 2362 | 1.50 | 0.03 | 98 | 2.05 |

EXAMPLE 3

A cylindrical laminar catalytic device having a diameter of 2 inches and a height of 1 inch was prepared by alternating layers of permanganate treated zirconia felt with silver coated nickel foam. The thickness of each of the 5 circular zirconia layers was 5/100 of an inch and that of each of the 4 interspaced circular nickel layers was 3/16 of an inch.

Before the assembly the zirconia circular wafers had been cut from a zirconia felt, having a relative density of 4 percent (8 percent yttria stabilized, type ZYF-50 obtained from Zircar Products, Inc., Florida, N.Y.). Then they were soaked in a bath containing a 0.1 M solution of potassium permanganate until thoroughly wetted and finally air dried.

The circular wafers of nickel were cut from a nickel foam having a relative density of about 4 percent and a porosity of 30 pores per inch.

The wafers were pretreated for 15 seconds in a bath maintained at room temperature and prepared from equal volumes of concentrated ammonium hydroxide and water. The wafers were then rinsed thoroughly first with tap water and then with deionized water. After shaking water out of the foam wafers, they were immersed in a 0.01 M silver nitrate bath for about 4 minutes at room temperature. After removal from the bath, excess solution was shaken out of the wafers, which were then rinsed with deionized water and dried in an oven at 75° C. overnight.

EXAMPLE 4

A cylindrical catalytic device (10 inch diameter, height 2.5 inches) was prepared by placing a length of permanganate treated zirconia tricot weave cloth onto a length of silver coated zinc coated aluminum foam and winding the two layers tightly in a spiral fashion around a 2.5 inch long mandrel having a diameter of one inch. The mandrel was fabricated from zinc coated aluminum pipe closed off at each end with 316 stainless steel cap affixed with silver solder.

The zirconia cloth was a tricot knit zirconia having a relative density of 15 percent and a thickness of 0.015 inches (8 percent yttria stabilized, type ZYK 15 obtained from Zircar Products, Inc.). The permanganate treatment of the cloth prior to assembly was carried out in accordance with the method set forth in Example 1.

The zinc coated aluminum foam substrate used in this example had a relative density of about 5 percent and a porosity of about 33 pores per inch. The silver coating procedure was the same as that of Example 2.

EXAMPLE 5

A catalytic device was prepared by sandwiching a piece of silver-coated nickel foam, 1 inch long by ½ inch wide by ⅛ inch thick, between two 1 inch by ½ inch pieces of permanganate treated zirconia cloth. The silver-coated nickel foam substrate assembly was prepared by copper plating the nickel foam using an electroless copper solution and the silver plating the copper plated nickel foam by the procedure described in Example 2.

EXAMPLE 6

A catalytic device was prepared exactly as described in Example 5 except that a zinc coated aluminum foam was used in place of the nickel foam described in Example 5.

The efficiency of the catalytic devices of Examples 5 and 6 were tested by passing ozone containing air at high rates through the catalytic devices. A silver coated copper foam containing device was similarly prepared and tested. The results of the tests are shown in Table II.

TABLE II

| Metal | Temp °F. | Air Rate ft/min | Ozone-ppm Inlet | Ozone-ppm Outlet | Efficiency % | Pressure Drop-psi |
|---|---|---|---|---|---|---|
| Copper | 350 | 4400 | 1.82 | 0.15 | 91 | .29 |
| Aluminum | 350 | 4400 | 1.75 | 0.85 | 51 | .19 |
| Nickel | 350 | 4400 | 1.71 | 0.20 | 88 | .25 |

What is claimed is:

1. A catalyst composition for the decomposition of ozone which comprises:
    (a) metallic silver deposited on a relatively high surface area metal substrate, and
    (b) a composite of a relatively high surface area zirconia and oxides of manganese.

2. The catalyst composition of claim 1 wherein the metal substrate is selected from particulate metal, foamed metal, metal felt and metal wire mesh.

3. The catalyst composition of claim 1, wherein the zirconia is selected from particulate zirconia, zirconia fibers, fibrous zirconia felt or zirconia cloth.

4. The catalyst composition of claim 1, wherein the thickness of the silver deposit is between about 0.001 and about 10 mils.

5. The catalyst composition of claim 4, wherein said thickness is between about 0.1 and about 1 mil.

6. The catalyst composition of claim 1, wherein the concentration of the oxides of manganese is between about 0.1 and about 10 percent based on the weight of the zirconia.

7. The catalyst composition of claim 6, wherein the concentration of oxides of manganese is between about 0.1 and about 0.5 percent based on the weight of the zirconia.

8. The catalyst composition of claim 1 wherein the volumetric ratio of components (a) and (b) is maintained between about 1:5 and about 100:1.

9. The catalyst composition of claim 8, wherein said volumetric ratio is between about 1:2 and about 50:1.

10. The catalyst composition of claim 1 wherein the relative density of the metal substrate ranges from about 2 to about 40 percent.

11. The catalyst composition of claim 1 wherein the relative density of the zirconia ranges from about 2 to about 40 percent.

12. The catalyst composition of claim 1 wherein the relative density of the metal substrate ranges from about 2 to about 10 percent.

13. The catalyst composition of claim 1, wherein the relative density of the zirconia ranges from about 2 to about 20 percent.

14. The catalyst composition of claim 1, wherein the zirconia is stabilized with an inorganic oxide.

15. The catalyst composition of claim 14, wherein the inorganic oxide is yttria.

16. The catalyst composition of claim 1, wherein the metal substrate is a nickel substrate.

17. The catalyst composition of claim 1, wherein the metal substrate is an aluminum substrate.

18. The catalyst composition of claim 1, wherein component
   (a) is prepared by a process comprising:
   (i) etching the metal substrate in a solution of ammonium hydroxide;
   (ii) rinsing the etched metal substrate with water, and subsequently
   (iii) treating it with a solution of a soluble silver salt to deposit an adherent coating of metallic silver on said metal substrate.

19. The catalyst composition of claim 1, wherein component (b) is prepared by impregnating the zirconia with a permanganate solution, removing excess solution from the impregnated zirconia and heating said impregnated zirconia to convert the permanganate to oxides of manganese.

20. The catalyst composition of claim 19, wherein said heating step is conducted during the use of the catalyst for ozone removal.

21. A catalytic device for ozone removal which comprises alternate layers of
   (a) metallic silver deposited on a relatively high surface area metal substrate and
   (b) a composite of a relatively high surface area zirconia and oxides of manganese.

22. The catalytic device according to claim 21 wherein the alternate layers are arranged in laminar fashion.

23. The catalytic device according to claim 21, wherein the alternate layers are arranged in spiral fashion.

24. The catalytic device according to claim 21, wherein the metal substrate is a metal foam and the zirconia is a fibrous zirconia felt.

25. The catalytic device according to claim 21, wherein the substrate is a metal foam and the zirconia is a woven cloth.

26. The catalytic device according to claim 21, wherein the metal substrate is a nickel foam.

27. The catalytic device according to claim 21, wherein the metal substrate is an aluminum foam.

28. The catalytic device according to claim 21, wherein the thickness of the silver deposit is between about 0.001 and about 10 mils, the concentration of the oxides of manganese is between about 0.1 and about 10 percent based on the weight of the zirconia, and the volumetric ratio of components (a) and (b) is maintained between about 1:2 and about 50:1.

* * * * *

UNITED STATES PATENT AND TRADEMARK OFFICE
CERTIFICATE OF CORRECTION

PATENT NO. : 4,261,863
DATED : April 14, 1981
INVENTOR(S) : Ronald A. Kent et al.

It is certified that error appears in the above-identified patent and that said Letters Patent are hereby corrected as shown below:

Column 3, line 32 - "coprecipiitate" should read -- coprecipitate -- .

Column 3, line 43 - "1.5" should read -- 1:5 -- .

Signed and Sealed this

Thirtieth Day of June 1981

[SEAL]

Attest:

RENE D. TEGTMEYER

Attesting Officer

Acting Commissioner of Patents and Trademarks